(12) United States Patent
Jung (10) Patent No.: US 12,188,105 B2
(45) Date of Patent: *Jan. 7, 2025

(54) STEEL MATERIAL FOR WELDING STEEL PIPE HAVING EXCELLENT LOW-TEMPERATURE TOUGHNESS, STEEL MATERIAL THAT HAS UNDERGONE WELD HEAT TREATMENT, AND METHOD FOR MANUFACTURING SAME

(71) Applicant: POSCO, Pohang-si (KR)

(72) Inventor: Hwan-Gyo Jung, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 605 days.

This patent is subject to a terminal disclaimer.

(21) Appl. No.: 16/760,170

(22) PCT Filed: Nov. 2, 2018

(86) PCT No.: PCT/KR2018/013261
§ 371 (c)(1),
(2) Date: Apr. 29, 2020

(87) PCT Pub. No.: WO2019/088762
PCT Pub. Date: May 9, 2019

(65) Prior Publication Data
US 2020/0255920 A1    Aug. 13, 2020

(30) Foreign Application Priority Data

Nov. 3, 2017    (KR) .................. 10-2017-0145686

(51) Int. Cl.
*C21D 6/00*    (2006.01)
*C21D 8/02*    (2006.01)
(Continued)

(52) U.S. Cl.
CPC ............... *C21D 9/50* (2013.01); *C21D 6/004* (2013.01); *C21D 6/005* (2013.01); *C21D 6/008* (2013.01);
(Continued)

(58) Field of Classification Search
CPC ........ C21D 2211/002; C21D 2211/005; C21D 9/50; C21D 8/0263; C21D 9/08
See application file for complete search history.

(56) References Cited

U.S. PATENT DOCUMENTS

2003/0217795 A1    11/2003    Asahi et al.
2010/0074794 A1    3/2010    Ahn et al.
(Continued)

FOREIGN PATENT DOCUMENTS

CN    102747272 A  *  10/2012
CN    103320692 A       9/2013
(Continued)

OTHER PUBLICATIONS

Extended European Search Report dated Jun. 24, 2020 issued in European Patent Application No. 18873376.0.
International Search Report dated Feb. 8, 2019 issued in International Patent Application No. PCT/KR2018/013261 (with English translation).

*Primary Examiner* — Anthony M Liang
*Assistant Examiner* — Jacob J Gusewelle
(74) *Attorney, Agent, or Firm* — Morgan, Lewis & Bockius LLP (57) ABSTRACT

The present invention relates to a steel material to which post weld heat treatment (PWHT) is applied after pipe making and, more specifically, to a steel material that maintains excellent low-temperature toughness even after undergoing a PWHT process, a steel material which is obtained therefrom, and which has undergone PWHT, and a method for manufacturing the same.

8 Claims, 2 Drawing Sheets

(51) Int. Cl.
*C21D 9/08* (2006.01)
*C21D 9/46* (2006.01)
*C21D 9/50* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/54* (2006.01)
*C22C 38/58* (2006.01)

(52) U.S. Cl.
CPC ......... *C21D 8/0205* (2013.01); *C21D 8/0226* (2013.01); *C21D 8/0263* (2013.01); *C21D 9/08* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 2211/002* (2013.01); *C21D 2211/005* (2013.01)

(56) References Cited

U.S. PATENT DOCUMENTS

| | | |
|---|---|---|
| 2014/0216609 A1 | 8/2014 | Nakata et al. |
| 2015/0140358 A1* | 5/2015 | Yokoyama .............. C22C 38/06 |
| | | 148/505 |
| 2016/0122844 A1 | 5/2016 | Liu et al. |

FOREIGN PATENT DOCUMENTS

| CN | 105463324 A | | 4/2016 | |
|---|---|---|---|---|
| JP | 2002241897 A | * | 8/2002 | |
| JP | 2003-293089 A | | 10/2003 | |
| JP | 2010077492 A | * | 4/2010 | |
| JP | 2013-011005 A | | 1/2013 | |
| JP | 2015-054983 A | | 3/2015 | |
| JP | 2015-190019 A | | 11/2015 | |
| KR | 10-0711371 A | | 4/2007 | |
| KR | 10-0797326 A | | 1/2008 | |
| KR | 10-2008-0040233 A | | 5/2008 | |
| KR | 10-2009-0070484 A | | 7/2009 | |
| KR | 10-2012-0073408 A | | 7/2012 | |
| KR | 10-2013-0002175 A | | 1/2013 | |
| KR | 2013002175 A | * | 1/2013 | ............... C21D 1/28 |
| KR | 10-2013-0076569 A | | 7/2013 | |
| KR | 10-2014-0083538 A | | 7/2014 | |
| KR | 10-2014-0083540 A | | 7/2014 | |
| KR | 10-2014-0090730 A | | 7/2014 | |
| KR | 20140083540 A | * | 7/2014 | |

* cited by examiner

STEEL MATERIAL FOR WELDING STEEL PIPE HAVING EXCELLENT LOW-TEMPERATURE TOUGHNESS, STEEL MATERIAL THAT HAS UNDERGONE WELD HEAT TREATMENT, AND METHOD FOR MANUFACTURING SAME

CROSS-REFERENCE OF RELATED APPLICATIONS

This application is the U.S. National Phase under 35 U.S.C. § 371 of International Patent Application No. PCT/KR2018/013261, filed on Nov. 2, 2018, which in turn claims the benefit of Korean Application No. 10-2017-0145686, filed on Nov. 3, 2017, the entire disclosures of which applications are incorporated by reference herein.

TECHNICAL FIELD

The present disclosure relates to a steel material to which a post-weld heat treatment (PWHT) is applied after pipe making, and more particularly, to a steel material which maintains excellent low-temperature toughness even after undergoing a PWHT process, a steel material to which a post-weld heat treatment has been performed, obtained therefrom, and a method for manufacturing the same.

BACKGROUND ART

A line-pipe steel pipe (e.g., having a thickness of 30 mm or less) mainly used for transportation of oil or a gas does not require a post-weld heat treatment (PWHT) process. However, a thick steel pipe having a thickness of 30 mm or greater requires a post heat treatment to remove residual stress of a weld zone formed in a welding process.

A post-weld heat treatment is a heat treatment process performed after welding, and there may be no particular problem in the case in which a heat treatment is only performed on a weld zone. However, most of thick steel pipe companies may manufacture a steel pipe by performing a heat treatment to an entire welded material, and accordingly, after such a heat treatment, there may also be changes in properties of a steel material.

As for changes in properties of a steel material caused in a post-weld heat treatment, most properties, such as strength, toughness, hydrogen induced cracking resistance, and the like, may change. Particularly, before a heat treatment of a steel material, a relatively excellent Charpy impact energy value or a drop weight tear test (DWTT) shear fracture percentage is exhibited, but after a heat treatment, low-temperature toughness may rapidly degrade such that properties conditions required for a use environment may not be satisfied.

Meanwhile, a post-weld heat treatment is mostly performed on a steel material to which a normalizing treatment has been performed, but some of steel pipe companies require a line-pipe steel material manufactured through a thermo mechanical controlled process (TMCP) under API standards.

After a post-weld heat treatment, a structure change caused by phase transformation may not occur, but in a steel material to which a normalizing process have been performed, cementite in perlite may become coarse after a post-weld heat treatment such that impact toughness may decrease, whereas, in a steel material manufactured through a TMCP, solid-solute carbon may be precipitated as carbide, or impact toughness and DWTT shear fracture percentage exhibit a tendency to degrade according to growth of ferrite.

The degradation of low-temperature toughness caused by a post-weld heat treatment may lead to an increase of ductility-brittleness transition temperature.

A steel material used for a thick steel pipe to which a post-weld heat treatment is applied may have a thickness of 30 mm or greater, and when the steel material is manufactured, a reduction ratio thereof may be low as compared to a thin steel sheet such that low-temperature toughness of the steel material may not be relatively excellent. In addition, degradation of low-temperature toughness may be aggravated due to a post-weld heat treatment such that low-temperature toughness of the steel material may further be deteriorated. Thus, there may be a limitation in manufacturing a steel pipe requiring low-temperature toughness of 0° C. or lower.

Thus, it has been necessary to develop a steel material which may improve low-temperature toughness of a steel material used for a steel pipe and of which deterioration of low-temperature toughness may be low even after a post-weld heat treatment.

(Reference 1) Korean Laid-Open Patent Publication No. 10-2014-0090730

DISCLOSURE

Technical Problem

An aspect of the present disclosure relates to a steel material used for a welded steel pipe, and more particularly, a steel material used for a welded steel pipe which may have a thickness of 30 mm or greater and excellent low-temperature toughness even after undergoing a post-weld heat treatment (PWHT) process after pipe making, a steel material to which a post-weld heat treatment has been performed, obtained therefrom, and a method for manufacturing the same.

Technical Solution

An aspect of the present disclosure provides a steel material for a welded steel pipe having excellent low-temperature toughness, the steel material including, by weight %, 0.03-0.10% of carbon (C), 0.1-0.5% of silicon (Si), 1.0-2.0% of manganese (Mn), 0.01-0.05% of aluminum (Al), 0.05-0.30% of molybdenum (Mo), 0.05-0.30% of chromium (Cr), 0.05-0.50% of nickel (Ni), 0.02-0.08% of niobium (Nb), 0.005-0.020% of titanium (Ti), 0.001-0.007% of nitrogen (N), 0.020% or lower of phosphorous (P), 0.0030% or lower of sulfur (S), 0.0005-0.005% of calcium (Ca), and a balance of Fe and inevitable impurities, and wherein, as a microstructure, a low-temperature transformation phase in 30% or lower (excluding 0%) by area fraction and a balance of ferrite are included, and the low-temperature transformation phase includes acicular ferrite and bainite.

Another aspect of the present disclosure provides a steel material to which a post-weld heat treatment has been performed, obtained by performing a post-weld heat treatment on the steel material for a welded steel pipe described above, and which has excellent low-temperature toughness, the steel material including, as a microstructure, bainite in 30% or lower (excluding 0%) by area fraction and a balance of ferrite.

Another aspect of the present disclosure provides a method for manufacturing a steel material for a welded steel pipe which has excellent low-temperature toughness, the method including reheating a steel slab satisfying the above-described alloy composition at 1050-1150° C.; rough-rolling the reheated steel slab; performing water-cooling to a temperature of a finishing rolling initiation temperature +30° C. or lower after the rough-rolling; performing finishing-rolling with a reduction ratio of 50-70% after the water-cooling, terminating the finishing-rolling at Ar3 or higher, and manufacturing a hot-rolled steel plate; and cooling the hot-rolled steel plate to 300-600° C. at a cooling rate of 5-50° C./s, and wherein the rough-rolling is performed at an average reduction ratio of a rear end 3-pass of 10% or higher, and a standby time to reach a finishing rolling temperature after the rough-rolling is 100 seconds or lower.

Another aspect of the present disclosure provides a method of manufacturing a steel material to which a post-weld heat treatment has been performed and which has excellent low-temperature toughness, the method including welding the steel material manufactured by the manufacturing method described above, and performing a post-weld heat treatment for 30-180 minutes per one inch of a thickness of the steel material within a temperature range of 580-640° C. after the welding.

Advantageous Effects

According to the present disclosure, there may be an effect of providing a steel material to which a post-weld heat treatment has been performed and which may have excellent low-temperature toughness, the steel material having a Charpy impact energy ductility-brittleness transition temperature of −50° C. or lower and a DWTT ductility-brittleness transition temperature of −10° C. or lower after a post-weld heat treatment, even though the steel material has a thickness of 30 mm or greater.

BEST MODE FOR INVENTION

Generally, as a measure for improving toughness of a steel material, a method of preventing a factor which may work as an initiation point of cracks, such as an inclusion, or the like, at most, or refining a grain, a transfer path of cracks.

Between the above methods, in the case of increasing cleanliness of steel by significantly reducing an inclusion, or the like, Charpy maximum absorption energy of a steel material may increase, but the effect thereof may be insignificant at a low temperature, and thus, the method may not be preferable to improve low-temperature toughness. Meanwhile, in the case of refining a grain, a ductility-brittleness transition temperature may increase, which may be advantageous in improving low-temperature toughness.

As described above, a ductility-brittleness transition temperature of a steel material may be closely related to a grain size, and the smaller the effective grain size, the more the ductility-brittleness transition temperature may decrease. In other words, as a Charpy energy value or a DWTT shear fracture percentage may be obtained at a relatively lower temperature, when the ductility-brittleness transition temperature is low, low-temperature toughness may be excellent.

A grain size of a steel material may be determined by a reheating process and a rolling process in a process of manufacturing the steel material, and a fine-sized grain may be obtained in a final structure by refining an effective grain size of austenite before phase transformation occurs in austenite.

As described above, the inventors have been reviewed the measures for improving low-temperature toughness of a steel material, and as a result, the inventors have tried to improve low-temperature toughness by refining grains and have aimed to optimize an alloy composition and manufacturing conditions advantageous thereto.

Particularly, in relation of providing a steel material exhibiting excellent low-temperature toughness even after a post-weld heat treatment, the inventors have been found that excellent low-temperature toughness may be secured even after a post-weld heat treatment by refining a grain size before a post-weld heat treatment or decreasing a fraction and a size of a structure (e.g., cementite) formed in a post-weld heat treatment, and have completed the present invention.

In the description below, the present disclosure will be described in greater detail.

A steel material for a welded steel pipe having excellent low-temperature toughness, and a steel material to which a post-weld heat treatment has been performed, obtained by the steel material for a welded steel pipe, may include, by weight %, 0.03-0.10% of carbon (C), 0.1-0.5% of silicon (Si), 1.0-2.0% of manganese (Mn), 0.01-0.05% of aluminum (Al), 0.05-0.30% of molybdenum (Mo), 0.05-0.30% of chromium (Cr), 0.05-0.50% of nickel (Ni), 0.02-0.08% of niobium (Nb), 0.005-0.020% of titanium (Ti), 0.001-0.007% of nitrogen (N), 0.020% or lower of phosphorous (P), 0.0030% or lower of sulfur (S), and 0.0005-0.005% of calcium (Ca), preferably.

In the description below, the reasons for controlling an alloy composition of the steel material for a welded steel pipe and the steel material to which a post-weld heat treatment has been performed as above will be described in greater detail. In the description, a content of each element may refer to weight % unless otherwise indicated.

C: 0.03-0.10%

Carbon (C) may be added to improve strength. The more the content of C increases, the more the strength may improve, but a fraction of cementite formed in a post-weld heat treatment may also increase, and a size thereof may become coarse, which may degrade low-temperature toughness. Also, phases which may be disadvantageous to securing toughness, such as bainite or martensite, may easily be formed.

In the present disclosure, to secure sufficient strength, 0.03% or higher of C may be added, and it may be preferable to limit an upper limit thereof to 0.10% to secure low-temperature toughness.

Thus, in the present disclosure, it may be preferable to limit a content of C to 0.03-0.10%, and may be more preferable to limit the content to 0.04-0.08%.

Si: 0.1-0.5%

Silicon (Si) may work as a deoxidizer, and may thus be added to control a concentration of oxygen in steel.

To obtain the above-described effect sufficiently, it may be preferable to add 0.1% or higher of Si. When the content exceeds 0.5%, there may be a problem in which the formation of a martensite-austenite constituent (MA) phase may be encouraged such that a ductility-brittleness transition temperature may increase and weldability may be deteriorated.

Accordingly, in the present disclosure, it may be preferable to limit a content of Si to 0.1-0.5%, and may be more preferable to limit the content to 0.15-0.4%. Mn: 1.0-2.0%

Manganese (Mn) may be effective for strengthening solid solution of steel.

In the present disclosure, to obtain the above-described effect, it may be preferable to add 1.0% or higher of Mn. The more the content of Mn increases, the more the hardenability may increase such that strength may improve, but when the content exceeds 2.0%, central segregation may be intensified such that toughness and weldability of a central part of the steel material may degrade, which may be a problem.

Thus, in the present disclosure, it may be preferable to limit the content of Mn to 1.0-2.0%, and may be more preferable to limit the content to 1.25-1.8%.

Al: 0.01-0.05%

Aluminum (Al) may be added for deoxidation in steel making. Also, Al may improve impact absorption energy of steel, and may be effective for forming an oxide-based inclusion by reacting with oxygen.

When a content of Al is less than 0.01%, deoxidation may not be sufficiently performed, whereas, when the content exceeds 0.05%, the amount of an oxidized inclusion may be excessive such that impact toughness may be deteriorated, which may be a problem.

Thus, in the present disclosure, it may be preferable to limit a content of Al to 0.01-0.05%, and may be more preferable to limit the content to 0.02-0.04%.

Mo: 0.05-0.30%

Molybdenum (Mo) may be a carbide formation element, and also, a diffusion speed of Mo may be relatively slow, such that Mo may be combined with Fe in a post-weld heat treatment and may form cementite having a form of $(Fe, Mo)_3C$. In this case, as a growth speed of the formed cementite is relatively slow in a post-weld heat treatment, the formed cementite may be refined, and may thus not affect low-temperature toughness of the steel material.

In the present disclosure, to obtain an effect according to addition of Mo, an effect of improving strength, it may be preferable to add 0.05% or higher of Mo. When the content exceeds 0.30%, manufacturing cost may increase, which may be economically disadvantageous, and an MA phase having extremely high hardness may easily formed such that low-temperature toughness of the steel material before a post-weld heat treatment may degrade, which may be a problem.

Thus, in the present disclosure, it may be preferable to limit a content of Mo to 0.05-0.30%, and may be more preferable to limit the content to 0.06-0.25%.

Cr: 0.05-0.30%

Chromium (Cr) may increase strength of steel by increasing hardenability of steel, and may form cementite having a form of $(Fe, Mo)_xC$, similarly to Mo.

To sufficiently obtain the effect described above, it may be preferable to add 0.05% or higher of Cr. When the content exceeds 0.30%, toughness may be deteriorated, which may not be preferable.

Accordingly, in the present disclosure, it may be preferable to limit a content of Cr to 0.05-0.30%, and may be more preferable to limit the content to 0.06-0.25%.

Ni: 0.05-0.50%

Nickel (Ni) may be an element for strengthening solid solution, and Ni may improve strength of steel and may also be advantageous to improving toughness.

To this end, it may be preferable to added 0.05% or higher of Ni. However, as Ni is an expensive element, when the content thereof is excessive, Ni may become a factor of an increase of manufacturing costs, and may deteriorate weldability.

Thus, in the present disclosure, it may be preferable to limit a content of Ni to 0.05-0.50%, and may be more preferable to limit the content to 0.06-0.45%.

Nb: 0.02-0.08%

Niobium (Nb) may be solid-solute around 1200° C. when a slab is reheated, and may delay recrystallization in a hot-rolling process performed subsequently. Thus, Nb may increase a temperature of a non-recrystallization region in which recrystallization does not occur. In other words, as Nb may increase a temperature range of a finishing rolling process in which a rolling process is performed in a non-recrystallization region, even when the finishing rolling is performed at a relatively high temperature, a grain may be refined, which may be an effect. Nb may also improve strength by being precipitated in a form of Nb(C,N).

To sufficiently obtain the above-describe effect, it may be preferable to add 0.02% or higher of Nb. When the content exceeds 0.08%, depending on continuous casting conditions, coarse crystallizing materials including Nb may be formed, which may work as a starting point of cracks.

Thus, in the present disclosure, it may be preferable to limit a content of Nb to 0.02-0.08%, and may be more preferable to limit the content to 0.025-0.07%.

Ti: 0.005-0.020%

Titanium (Ti) may form carbide or nitride, and may prevent grain growth of an austenite phase when being reheated. Consequently, Ti may be effective for forming finely homogenized ferrite, and may thus improve low-temperature toughness.

To sufficiently obtain the above-described effect, it may be preferable to add 0.005% or higher of Ti. When the content is excessive, Ti may react with all nitrogen (N) in steel and may hinder formation of a Nb(C,N) precipitate advantageous to low-temperature toughness and accordingly, Ti may rather deteriorate low-temperature toughness. Thus, in consideration of this, it may be preferable to limit an upper limit of Ti to 0.020%.

It may be advantageous to limiting Ti to 0.010-0.015% more preferably.

N: 0.001-0.007%

Nitrogen (N) may form nitride by being combined with Al, Ti, Nb, and the like, such that N may prevent austenite grain growth, which may be an effect. To this end, it may be preferable to add 0.001% or higher of N. When the content exceeds 0.007%, coarse TiN may be precipitated, which may degrade impact toughness and may also increase a fraction of NbN, VN, and the like, which may be difficult to be dissolved when being reheated, such that the amount of carbides such as NbC, VC, and the like, which may be precipitated in a post-weld heat treatment, may decrease, and improvement of strength after a post-weld heat treatment may not be insufficient.

Thus, in the present disclosure, it may be preferable to limit a content of N to 0.001-0.007%, and may be more preferable to limit the content to 0.003-0.006%.

P: 0.020% or lower

Phosphorous (P) may be inevitably contained in steel making, and may deteriorate weldability and toughness of a steel material, which may be a problem. Also, when being solidified, P may easily be precipitated to a central part of a slab and an austenite grain boundary, and accordingly, P may deteriorate low-temperature toughness and hydrogen induced cracking resistance.

Thus, in the present disclosure, it may be preferable to significantly reduce a content of P, but in consideration of load generated in a steel making process, an upper limit thereof may be limited to 0.020% or lower.

S: 0.003% or lower

Sulfur (S) may be inevitably added in steel making. S may be combined with Mn and may form MnS. Accordingly, S may be elongated in rolling and may work as a starting point of cracks, and may also deteriorate low-temperature toughness.

Thus, in the present disclosure, it may be preferable to significantly reduce a content of S, but in consideration of load generated in a steel making process, an upper limit thereof may be limited to 0.003% or lower.

Ca: 0.0005-0.005%

Calcium (Ca) may allow an MnS inclusion to be spherical. An MnS inclusion may have a relatively low melting point, and in rolling, an MnS inclusion may work as an initiation point of cracks. When Ca is added, Ca may react with MnS and may surround MnS such that Ca may interfere with elongation of MnS.

The effect of making MnS spherical of Ca may closely relate to a content of S, and to sufficiently obtain the effecting of being spherical in the present disclosure, it may be preferable to add 0.0005% or higher of Ca. As Ca has high volatility and may accordingly have a low yield, in consideration of load generated in a manufacturing process, it may be preferable to limit an upper limit thereof to 0.005%.

It may be more preferable to limit Ca to 0.0008-0.004%.

The steel material of the present disclosure may secure intended properties by satisfying the above-described alloy composition. To further improve the properties, however, the steel material may further include one or more elements of V, Cu, and B as below.

V: 0.005-0.05%

Vanadium (V) may be precipitated in a ferrite region in a form of VC, but when a content of N in steel is sufficient, V may form VN.

In the present disclosure, when 0.005% or higher of V is added, V may decrease a concentration of eutectoid carbon in austenite-ferrite transformation, and VC may provide a place for formation of a nucleus to form cementite. Thus, V may have a discontinuous structure form, rather than $Fe_3C$ continuously being formed on a grain boundary, such that V may have an effect of preventing degradation of toughness. When a content thereof exceeds 0.05%, a coarse V precipitate may be formed such that toughness may rather be degraded.

Thus, in the present disclosure, when V is added, it may be preferable to limit a content thereof to 0.005-0.05%.

Cu: 0.05-0.3%

Copper (Cu) may be added to aim improvement of strength and toughness of steel at the same time. As Cu may be solid-solute in steel and may improve strength, it may be preferable to add 0.05% or higher of Cu. When a content thereof exceeds 0.3%, Cu may cause cracks on a surface in hot-rolling and may deteriorate surface quality.

Thus, in the present disclosure, when Cu is added, it may be preferable to limit a content thereof to 0.05-0.3%.

B: 0.0005-0.001%

Boron (B) may have extremely high hardenability, and may contribute to improving strength even by adding a small amount of B. To intentionally improve strength by adding B, it may be preferable to add 0.0005% or higher of B. When B is added, however, a structure may sensitively change according to cooling, and when a content thereof exceeds 0.001%, a low-temperature transformation phase, such as bainite, may be easily formed even under general cooling conditions such that low-temperature toughness may be deteriorated.

Thus, in the present disclosure, when B is added, it may be preferable to limit a content thereof to 0.0005-0.001%.

A remainder of the present disclosure is Fe. However, in a general manufacturing process, inevitable impurities may be inevitably added from raw materials or an ambient environment, and thus, impurities may not be excluded. A person skilled in the art of a general manufacturing process may be aware of the impurities, and thus, the descriptions of the impurities may not be provided in the present disclosure.

The steel material for a welded steel pipe of the present disclosure, which satisfies the above-described alloy composition, may be manufactured under a series of manufacturing conditions described below, and may be a thick steel material having a thickness of 30 mm or greater.

The steel material for a welded steel pipe may include, as a microstructure, a low-temperature transformation phase (acicular ferrite+bainite) in 30% or lower (excluding 0%) by area fraction and a balance of ferrite preferably. It may be preferable to include acicular ferrite in 5-10% by area fraction.

Particularly, it may be preferable to form an average grain size of bainite at a central part of a thickness to be 30 μm or less, and may be preferable to form an average grain size of ferrite at a central part of a thickness to be less than 20 μm.

When an average grain size of bainite at a central part of a thickness of the steel material exceeds 30 μm, deterioration of low-temperature toughness may occur, which may not be preferable. Also, when an average grain size of ferrite at a central part of a thickness is 20 μm or greater, a DWTT ductility-brittleness transition temperature after a subsequent post-weld heat treatment may exceed −10° C. such that low-temperature toughness may be deteriorated, which may be a problem.

In the steel material to which a post-weld heat treatment (PWHT) has been performed, obtained by performing the post-weld heat treatment on the steel material for a welded steel pipe of the present disclosure having the above-described structure, grain growth may be prevented in a heat treatment such that a structure may have a fine grain.

In other words, the steel material of the present disclosure to which a post-weld heat treatment has been performed may include, as a microstructure, bainite in 30% or lower (excluding 0%) by area fraction and a balance of ferrite, and an average grain size of bainite and an average grain size of ferrite of at a central part of a thickness may satisfy 30 μm or less and less than 20 μm, respectively. Bainite may refer to bainitic ferrite, and may partially include acicular ferrite.

In a steel material having a ferrite single-phase structure, manufactured by a general TMCP process, oversaturated carbons may form thermodynamically stable cementite mainly on a grain boundary in a post-weld heat treatment, and as the time of the heat treatment increases, cementite growth may occur. As a size and a shape of the formed cementite may be dependent on a concentration of carbon, and coarse cementite formed on a grain boundary may work as an initiation point of cracks, there may be a concern that toughness may decrease. Also, in a heat treatment, coarsening of a ferrite grain may occur such that an average grain size may increase, which may degrade toughness.

However, according to the present disclosure, even when a post-weld heat treatment is performed on a steel material having a thickness of 30 mm or greater, refinement of a ferrite grain may be maintained, and a fine bainite phase may be formed. Accordingly, excellent low-temperature toughness of the steel material to which a post-weld heat treatment has been performed may be maintained.

Preferably, the steel material to which a post-weld heat treatment has been performed may secure a DWTT ductility-brittleness transition temperature of −10° C. or lower.

In the description below, a method of manufacturing a steel material for a welded steel pipe having excellent low-temperature toughness and a steel material to which a post-weld heat treatment has been performed will be described in detail according to another aspect of the present disclosure.

The steel material for a welded steel pipe in the present disclosure may be manufacturing by allowing a steel slab satisfying the alloy component suggested in the present disclosure to go through processes of [reheating-hot-rolling (rough-rolling and finishing rolling)-cooling], and in the description below, conditions of each process above will be described in greater detail.

Reheating Steel Slab

In the present disclosure, preferably, a steel slab satisfying the above-described alloy composition may be prepared, and may be reheated. The reheating may be performed at 1050° C. or higher, preferably, to make Nb or V solid-solute by dissolving Nb or V carbonitride formed in continuous casting and present in the steel slab. When the reheating temperature exceeds 1150° C., solid-solution of Nb or V may easily be performed, but grains of austenite may rapidly grow at the same time, which may deteriorate low-temperature toughness.

Thus, in the present disclosure, when the steel slab is reheated, it may be preferable to perform the reheating within a temperature range of 1050-1150° C.

Rough-Rolling

It may be preferable to hot-roll the steel slab reheated as above to manufacture a hot-rolled steel plate, and it may be preferable to perform the rough-rolling as a process of manufacturing a bar, an intermediate material.

Through the rough-rolling process, an effect of decreasing a grain size of reheated austenite using an austenite recrystallization phenomenon may be obtained, and to this end, it may be necessary to control a temperature and a reduction ratio per rolling pass of the rough-rolling.

Specifically, in the rolling pass at an initial stage of the rough-rolling, it may be difficult to apply a high reduction ratio due to width widening or bending of a slab such that recrystallization may not sufficiently occur. Thus, it may be preferable to increase a reduction ratio of a rear end rolling pass, which may increase a reduction ratio per pass.

More preferably, in the rough-rolling, it may be preferable to perform the rough-rolling with an average reduction ratio of a rear end 3 pass of 10% or higher. When the average reduction ratio of a rear end 3 pass is less than 10%, partial recrystallization may occur such that a duplex phenomenon in which fine austenite where recrystallization has occurred and coarse austenite grains where recrystallization has not occurred coexist may occur. There may be a concern that the coarse austenite may form coarse bainitic ferrite after subsequent finishing rolling and cooling.

Also, the rough-rolling may need to be completed at a temperature at which partial recrystallization does not occur, and thus, it may be preferable to complete the rough-rolling at 1020° C. or higher.

Cooling

Generally, a process in which a bar manufactured through rough-rolling after reheating a steel slab may be standby until a temperature reaches a finishing rolling temperature may be performed. When a thickness of a steel material is 30 mm or greater, the standby time may simply be several hundreds of seconds or longer, and as an austenite grain may be grown in this process, low-temperature toughness may be deteriorated.

In other words, in the case of a steel material having a thickness of 30 mm or greater, an overall reduction ratio and a reduction ratio of the non-recrystallization region rolling performed at a non-recrystallization region temperature or lower may be low, and to perform finishing rolling at a non-recrystallization region temperature or lower, a standby time may be significantly lengthened after rough-rolling. Accordingly, as an austenite grain may be grown, there may be a limitation in reducing an initial austenite grain size before transformation, and thus, there may be a limitation in improving low-temperature toughness.

Accordingly, in the present disclosure, to prevent the growth of an austenite grain occurring during the standby for several hundreds of seconds or longer, the bar obtained by the rough-rolling as above may not be air-cooled, and may be water-cooled using a cooling facility so as to significantly reduce the standby time and to prevent the austenite grain growth.

More specifically, it may be preferable to perform the water-cooling to a finishing rolling initiation temperature+30° C. or lower right after the rough-rolling, and particularly, it may be preferable to control the standby time to reach a finishing rolling temperature to be 100 seconds or less right after the rough-rolling.

When a temperature at which the water-cooling is terminated exceeds the finishing rolling initiation temperature+30° C., the air-cooling time to reach the finishing rolling temperature after terminating the water-cooling may be lengthened such that austenite grain growth may occur, and accordingly, low-temperature toughness may be deteriorated, which may not be preferable.

The water-cooling may be performed up to the finishing rolling initiation temperature, and if the water-cooling process is completed at the finishing rolling initiation temperature or higher, it may be preferable to perform the air-cooling up to the finishing rolling temperature thereafter.

Meanwhile, a cooling speed of the water-cooling may be varied depending on a thickness of the bar, and the like, and thus, in the present disclosure, the cooling speed may not be particularly limited. However, by controlling the standby time to reach the finishing rolling temperature after the rough-rolling, the cooling speed may be appropriately selected accordingly.

Finishing Rolling

It may be preferable to, after completing the rough-rolling as described above, perform a finishing rolling process to manufacture a hot-rolled steel plate.

The finishing rolling process is a process to form a deformation band working as a nucleus formation region of ferrite transformation in an austenite grain. To obtain fine grains, the control over a reduction ratio in the rolling may be important.

In the present disclosure, in the finishing rolling, the finishing rolling may be initiated at 900° C. or lower and with an overall reduction ratio of 50-70%, and it may be preferable to terminate the finishing rolling at Ar3 or higher.

In the finishing rolling, when an overall reduction ratio is less than 50%, the amount of deformation accumulated in austenite may decrease such that grain refinement may not be obtained. When the reduction ratio exceeds 70%, recrystallization may not sufficiently occur in a thick steel material having a thickness of 30 mm or greater such that an austenite grain duplex phenomenon may occur. Accordingly, after the finishing rolling is terminated, coarse bainite may be locally formed such that low-temperature toughness may be deteriorated.

Also, when a termination temperature in the finishing rolling is less than Ar3, deformed ferrite and a bainite phase may be formed such that low-temperature toughness may be deteriorated.

Ar3 may be calculated through the equation as below.

$$Ar3=910-(310\times C)-(80\times Mn)-(20\times Cu)-(15\times Cr)-(55\times Ni)-(80\times Mo)+0.35(Thick-8)$$

(in the equation, each element indicates a weight content.)

Cooling

It may be preferable to water-cool the hot-rolled steel plate manufactured as above, and in this case, it may be preferable to control a structure phase fraction and an effective grain size by optimizing a cooling termination temperature and a cooling speed.

Specifically, when the hot-rolled steel plate is water-cooled, it may be preferable to cool the hot-rolled steel plate to 300-600° C. at a cooling rate of 5-50° C./s.

When the cooling rate is less than 5° C./s, an average grain size of ferrite may be 20 μm or greater such that low-temperature toughness may degrade, which may be a problem. When the cooling rate exceeds 50° C./s, a bainite structure may exceed 30% by area fraction such that there may be a concern that low-temperature toughness may be deteriorated.

Meanwhile, when the cooling is performed at the above-mentioned cooling speed, there may be a concern that perlite and bainite phases may be excessive formed in a final air-cooling process when a cooling termination temperature is excessively high. Thus, it may be preferable to control an upper limit of the cooling termination temperature to 600° C. Also, when the cooling termination temperature is excessively low, a low-temperature transformation phase may be formed, which may deteriorate toughness of steel. Thus, it may be preferable to limit a lower limit of the cooling termination temperature to 300° C.

After obtaining the steel material for a welded steel pipe having an intended microstructure by performing a series of the processes described above, the steel material may be welded and a post-weld heat treatment may be performed on the steel material such that a steel material to which a post-weld heat treatment has been performed may be manufactured.

As the welding method, a general welding method may be used. As an example, a submerged arc welding method may be used.

Preferably, the post-weld heat treatment may be performed for 30-180 minutes per one inch of a thickness of the steel material at 580-640° C.

When the temperature is less than 580° C. or the heat treatment time is less than 30 minutes in the post-weld heat treatment, residual stress generated in a welded part may not be completely removed. When the temperature exceeds 640° C. or the heat treatment time exceeds 180 minutes, cementite and grains may grow excessively such that strength after the post-weld heat treatment may rapidly decrease, and low-temperature toughness may be deteriorated, which may be problematic.

A post-weld heat treatment may be performed on a general thick steel material having a thickness of 30 mm or greater to remove residual stress after welding, and in this case, a ferrite grain may become coarse, and cementite, and the like, may be precipitated by the heat treatment such that low-temperature toughness may further be deteriorated. Accordingly, it may be difficult to secure excellent low-temperature toughness in a steel pipe to which a post-weld heat treatment is performed.

The steel material which has a thickness of 30 mm or greater and to which a post-weld heat treatment has been performed, provided in the present disclosure, the grain coarsening phenomenon may be prevented in a heat treatment such that excellent low-temperature toughness may be maintained, and preferably, a DWTT ductility-brittleness transition temperature of −10° C. or lower may be secured.

In the description below, an example embodiment of the present disclosure will be described in greater detail. It should be noted that the example embodiments are provided to describe the present disclosure in greater detail, and to not limit the present disclosure. The scope of right of the present disclosure may be determined based on the matters recited in the claims and the matters rationally inferred therefrom.

MODE FOR INVENTION

Embodiment

A steel slab having an alloy composition indicated in Table 1 as below was manufactured, and the steel slab went through processes of [reheating-rough-rolling-cooling-finishing rolling-cooling] under the conditions as listed in Table 2 as below, thereby manufacturing each steel material.

Thereafter, each steel material was submerged-arc-welded with heat input of 25 kJ/cm to make the steel material as a steel pipe, and a post-weld heat treatment was performed, thereby manufacturing a steel material to which the post-weld heat treatment has been performed. In this case, the conditions of the post-weld heat treatment were listed in Table 3 below.

A sample of each steel material was obtained, a microstructure was observed, mechanical properties were examined, and a result thereof is listed in Table 4 below.

As for the microstructure, each sample was etched and was observed on an optical microscope, and a fraction and a grain size of each phase were measured.

In addition, a tensile test, and a Charpy impact test at −50° C. were conducted with respect to each sample, a DWTT transition test was conducted at a temperature from 0 to −50° C., and a DWTT ductility-brittleness transition temperature was examined with reference to a shear fracture percentage of 80%.

TABLE 1

| Steel Type | Alloy Composition (Weight %) | | | | | | | | | | | | | |
|---|---|---|---|---|---|---|---|---|---|---|---|---|---|---|
| | C | Mn | Si | P | S | Al | Ni | Cr | Mo | Nb | Ti | Ca | N | Others |
| Inventive Steel 1 | 0.04 | 1.3 | 0.25 | 0.015 | 0.0016 | 0.03 | 0.10 | 0.20 | 0.07 | 0.045 | 0.010 | 0.0012 | 0.0050 | Cu 0.15 |
| Inventive Steel 2 | 0.05 | 1.4 | 0.30 | 0.012 | 0.0012 | 0.025 | 0.15 | 0.15 | 0.10 | 0.040 | 0.012 | 0.0015 | 0.0060 | V 0.04 |
| Inventive Steel 3 | 0.06 | 1.5 | 0.30 | 0.013 | 0.0010 | 0.02 | 0.25 | 0.05 | 0.10 | 0.030 | 0.010 | 0.0010 | 0.0050 | B 0.0006 |
| Inventive Steel 4 | 0.05 | 1.6 | 0.40 | 0.008 | 0.0014 | 0.03 | 0.30 | 0.10 | 0.15 | 0.025 | 0.015 | 0.0009 | 0.0040 | Cu 0.1 V 0.025 |
| Inventive Steel 5 | 0.07 | 1.5 | 0.20 | 0.016 | 0.0018 | 0.04 | 0.35 | 0.15 | 0.20 | 0.030 | 0.012 | 0.0012 | 0.0060 | V 0.05 B 0.0005 |
| Inventive Steel 6 | 0.08 | 1.5 | 0.20 | 0.014 | 0.0014 | 0.02 | 0.30 | 0.25 | 0.15 | 0.040 | 0.012 | 0.0024 | 0.0050 | — |
| Inventive Steel 7 | 0.05 | 1.85 | 0.15 | 0.018 | 0.0016 | 0.03 | 0.40 | 0.20 | 0.10 | 0.035 | 0.010 | 0.0013 | 0.0050 | Cu 0.2 B 0.0008 |
| Comparative Steel 1 | 0.15 | 1.05 | 0.10 | 0.002 | 0.0015 | 0.035 | 0.45 | 0.30 | 0.55 | 0.047 | 0.011 | 0.0020 | 0.0055 | — |
| Comparative Steel 2 | 0.12 | 1.5 | 0.25 | 0.016 | 0.0014 | 0.025 | 0.30 | 0.30 | 0 | 0.030 | 0 | 0.0008 | 0.0055 | V 0.04 |
| Comparative Steel 3 | 0.10 | 1.9 | 0.40 | 0.010 | 0.0014 | 0.04 | 0.20 | 0.20 | 0 | 0 | 0.010 | 0.0010 | 0.0045 | — |
| Comparative Steel 4 | 0.08 | 2.0 | 0.25 | 0.018 | 0.0014 | 0.025 | 0 | 0 | 0.20 | 0.015 | 0 | 0 | 0.0050 | B 0.0008 |

TABLE 2

| Steel Type | Rough-Rolling | | | | | Finishing Rolling | | | Cooling | | Tnr | Ar3 | Classification |
|---|---|---|---|---|---|---|---|---|---|---|---|---|---|
| | Reheating Temperature (° C.) | Rear End 3 Pass Reduction Ratio | Termination Temperature (° C.) | Water-Cooling Temperature (° C.) | Standby Time (Seconds) | Initiation Temperature (° C.) | Overall Reduction Ratio | Termination Temperature (° C.) | Termination Temperature (° C.) | Speed (° C./s) | | | |
| Inventive Steel 1 | 1120 | 12% | 1060 | 900 | 90 | 890 | 65% | 820 | 480 | 25 | 989.5 | 785 | Inventive Example 1 |
| | 1120 | 11% | 1050 | 900 | 85 | 890 | 65% | 810 | 450 | 28 | | | Inventive Example 2 |
| | 1120 | 12% | 1060 | — | 450 | 890 | 65% | 820 | 480 | 25 | | | Comparative Example 1 |
| Inventive Steel 2 | 1140 | 12% | 1070 | 880 | 90 | 860 | 68% | 780 | 500 | 22 | 935.1 | 773 | Inventive Example 3 |
| Inventive Steel 3 | 1120 | 13% | 1040 | 880 | 80 | 860 | 65% | 800 | 480 | 27 | 905.7 | 758 | Inventive Example 4 |
| | 1080 | 11% | 1020 | 870 | 70 | 850 | 58% | 790 | 430 | 30 | | | Inventive Example 5 |
| | 1180 | 9% | 1040 | 880 | 80 | 860 | 65% | 800 | 480 | 27 | | | Comparative Example 2 |
| Inventive Steel 4 | 1140 | 13% | 1060 | 870 | 70 | 850 | 68% | 770 | 450 | 28 | 832.9 | 743 | Inventive Example 6 |
| | 1140 | 13% | 1060 | — | 600 | 770 | 75% | 700 | 450 | 20 | | | Comparative Example 3 |

TABLE 2-continued

| Steel Type | Reheating Temperature (°C) | Rough-Rolling Rear End 3 Pass Reduction Ratio | Rough-Rolling Termination Temperature (°C) | Water-Cooling Temperature (°C) | Standby Time (Seconds) | Finishing Rolling Initiation Temperature (°C) | Finishing Rolling Overall Reduction Ratio | Finishing Rolling Termination Temperature (°C) | Cooling Termination Temperature (°C) | Speed (°C./s) | Tnr | Ar3 | Classification |
|---|---|---|---|---|---|---|---|---|---|---|---|---|---|
| Inventive Steel 5 | 1100 | 12% | 1020 | 880 | 60 | 860 | 65% | 810 | 400 | 33 | 940.1 | 734 | Inventive Example 7 |
| Inventive Steel 6 | 1100 | 12% | 1030 | 900 | 60 | 870 | 68% | 810 | 430 | 32 | 999.7 | 742 | Inventive Example 8 |
|  | 1140 | 11% | 1050 | 880 | 70 | 870 | 60% | 800 | 380 | 35 |  |  | Inventive Example 9 |
| Inventive Steel 7 | 1120 | 13% | 1040 | 870 | 70 | 850 | 68% | 780 | 420 | 30 | 981.5 | 720 | Inventive Example 10 |
|  | 1120 | 8% | 1040 | 870 | 70 | 850 | 70% | 780 | 280 | 40 |  |  | Comparative Example 4 |
| Comparative Steel 1 | 1120 | 12% | 1060 | 900 | 90 | 890 | 65% | 820 | 480 | 25 | 1106.7 | 715 | Comparative Example 5 |
| Comparative Steel 2 | 1140 | 12% | 1070 | 850 | 100 | 820 | 70% | 760 | 480 | 22 | 927.6 | 741 | Comparative Example 6 |
| Comparative Steel 3 | 1100 | 10% | 1020 | 900 | 85 | 860 | 65% | 790 | 500 | 25 | 814 | 722 | Comparative Example 7 |
| Comparative Steel 4 | 1050 | 7% | 980 | 850 | 70 | 830 | 65% | 760 | 350 | 28 | 861.7 | 718 | Comparative Example 8 |

TABLE 3

| Classification | Post-Weld Heat Treatment (PWHT) Temperature (°C) | Post-Weld Heat Treatment (PWHT) Time (mins) | Final Thickness (mm) |
|---|---|---|---|
| Inventive Example 1 | 600 | 100 | 32 |
| Inventive Example 2 | 610 | 120 | 32 |
| Comparative Example 1 | 600 | 100 | 32 |
| Inventive Example 3 | 590 | 120 | 34 |
| Inventive Example 4 | 600 | 100 | 34 |
| Inventive Example 5 | 620 | 80 | 32 |
| Comparative Example 2 | 600 | 100 | 34 |
| Inventive Example 6 | 630 | 60 | 31 |
| Comparative Example 3 | 630 | 60 | 31 |
| Inventive Example 7 | 580 | 150 | 35 |
| Inventive Example 8 | 600 | 100 | 35 |
| Inventive Example 9 | 600 | 120 | 38 |
| Inventive Example 10 | 610 | 100 | 38 |
| Comparative Example 4 | 610 | 100 | 38 |
| Comparative Example 5 | 600 | 100 | 32 |
| Comparative Example 6 | 590 | 120 | 34 |
| Comparative Example 7 | 600 | 100 | 34 |
| Comparative Example 8 | 580 | 90 | 34 |

TABLE 4

| | Mechanical Properties | | | | Microstructure | | | |
|---|---|---|---|---|---|---|---|---|
| | | | | DWTT | | | | |
| Classification | Yield Strength (MPa) | Tensile Strength (MPa) | Charpy Energy (J, −50° C.) | Transition Temperature (° C.) | F Fraction (%) | B Fraction (%) | F Size (μm) | B Size (μm) |
| Inventive Example 1 | 485 | 574 | 355 | −40 | 98 | 2 | 13 | 19 |
| Inventive Example 2 | 490 | 580 | 367 | −28 | 97 | 3 | 15 | 22 |
| Comparative Example 1 | 463 | 583 | 405 | −8 | 99 | 1 | 24 | 33 |
| Inventive Example 3 | 520 | 615 | 360 | −25 | 95 | 5 | 15 | 17 |
| Inventive Example 4 | 530 | 630 | 380 | −25 | 96 | 4 | 16 | 16 |
| Inventive Example 5 | 540 | 628 | 360 | −25 | 96 | 4 | 15 | 20 |
| Comparative Example 2 | 490 | 560 | 280 | −8 | 95 | 5 | 25 | 31 |
| Inventive Example 6 | 535 | 620 | 390 | −35 | 97 | 3 | 16 | 19 |
| Comparative Example 3 | 515 | 596 | 220 | −5 | 85 | 15 | 25 | 37 |
| Inventive Example 7 | 554 | 650 | 325 | −20 | 93 | 7 | 15 | 19 |
| Inventive Example 8 | 540 | 654 | 297 | −15 | 88 | 12 | 15 | 17 |
| Inventive Example 9 | 539 | 628 | 310 | −20 | 91 | 9 | 15 | 20 |
| Inventive Example 10 | 515 | 609 | 385 | −20 | 87 | 13 | 16 | 24 |
| Comparative Example 4 | 510 | 675 | 103 | 0 | 65 | 35 | 22 | 35 |
| Comparative Example 5 | 525 | 630 | 150 | −5 | 88 | 12 | 22 | 29 |
| Comparative Example 6 | 509 | 584 | 155 | −5 | 93 | 7 | 23 | 36 |
| Comparative Example 7 | 470 | 560 | 160 | 0 | 95 | 5 | 28 | 39 |
| Comparative Example 8 | 495 | 563 | 110 | −5 | 94 | 6 | 25 | 37 |

As indicated in Tables 1 to 4, in the case of inventive examples 1 to 10 of which both alloy compositions and manufacturing conditions satisfied the present disclosure, a fine grain was maintained even after a post-weld heat treatment such that, when the DWTT transition temperature was less than −10° C., Charpy energy at −50° C. was 250 J or higher, which indicates that low-temperature toughness was excellent.

In the case of comparative examples 1 to 8 which did not satisfy the alloy compositions or the manufacturing conditions controlled in the present disclosure, the DWTT transition temperature exceeded −10° C. after the post-weld heat treatment, and Charpy energy at −50° C. was less than 300 J, which indicates that low-temperature toughness was deteriorated.

That is because, in the case of comparative examples 1 to 8, as a ferrite grain size was coarse, and a fraction of bainite phase was increased, low-temperature toughness was deteriorated.

Figure 1:
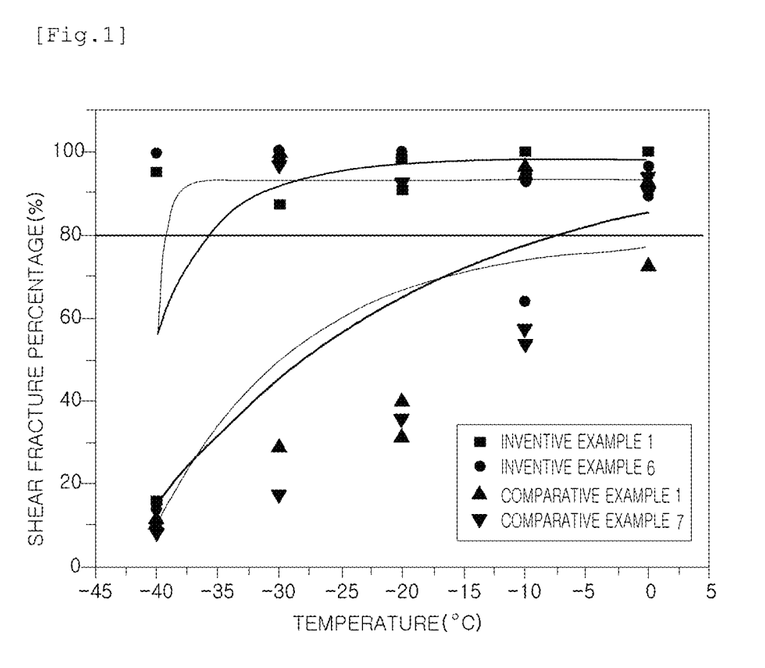
FIG. 1 is graphs indicating a result of a DWTT transition test of a steel material to which a post-weld heat treatment has been performed according to an example embodiment of the present disclosure.

Meanwhile, FIG. 1 indicates results of a DWTT transistor test at −40~0° C. of inventive example 1, inventive example 6, comparative example 1 and comparative example 7.

As illustrated in FIG. 1, when a ductility-brittleness transition temperature was determined with reference to a shear fraction percentage of 80%, a transition temperature of inventive example 1 was −40° C., and a transition temperature of inventive example 6 was −35° C., whereas transition temperatures of comparative examples 1 and 7 were −8° C. and 0° C., respectively.

Figure 2:
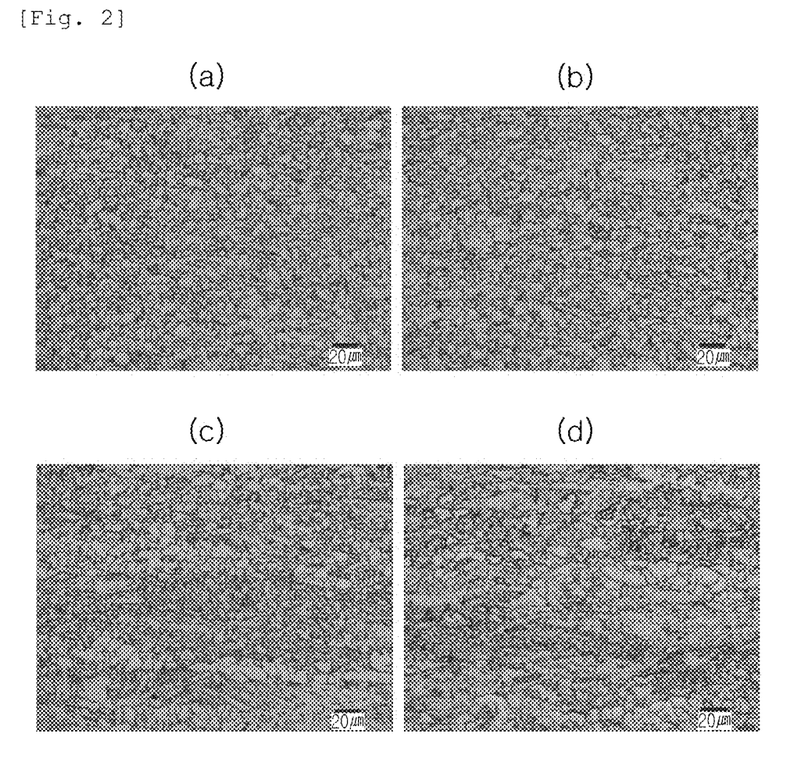
FIG. 2 is images of a microstructure of a steel material to which a post-weld heat treatment has been performed according to an example embodiment of the present disclosure.

FIG. 2 is images of microstructures of inventive example 1(a), inventive example 5 (b), comparative example 5 (d), and comparative example 7(c).

As shown in FIG. 2, in inventive examples 1 and 5, homogeneous and fine grains were formed entirely even after the post-weld heat treatment, and a fraction of bainite phase was low. In comparative examples 5 and 7, however, sizes of grains were not homogeneous, and a coarse ferrite phase of 20 μm or greater was partially formed. Also, coarse bainite was formed in a middle part and a lower end part of the structure image as shown in the images, and low-temperature toughness was deteriorated due to such coarse ferrite and coarse bainite.

The invention claimed is:

1. A steel material for a welded steel pipe, the steel material comprising:
by weight %, 0.03-0.10% of carbon (C), 0.1-0.5 of silicon (Si), 1.0-2.0% of manganese (Mn), 0.01-0.05% of aluminum (Al), 0.05-0.30% of molybdenum (Mo), 0.05-0.30% of chromium (Cr), 0.05-0.50% of nickel (Ni), 0.02-0.08% of niobium (Nb), 0.005-0.020% of titanium (Ti), 0.001-0.007% of nitrogen (N), 0.020% or lower of phosphorous (P), 0.0030% or lower of sulfur(S), 0.0005-0.005% of calcium (Ca), and a balance of Fe and inevitable impurities,
wherein, the steel material has a microstructure consisting of a low-temperature transformation phase of 30% or lower excluding 0% by area fraction and a balance of ferrite, and the low-temperature transformation phase includes at least one of acicular ferrite and bainite,
wherein the microstructure of the steel material includes acicular ferrite of 5 to 10% by area fraction.

2. The steel material of claim 1, wherein the steel further includes one or more elements selected from among 0.005-0.05% of V, 0.05-0.3% of Cu, and 0.0005-0.001% of B.

3. The steel material of claim 1, wherein an average grain size of bainite at a central part of a thickness of the steel material is 30 μm or less.

4. The steel material of claim 1, wherein an average grain size of ferrite at a central part of a thickness of the steel material is less than 20 μm.

5. A steel material to which a post-weld heat treatment has been performed, obtained by performing a post-weld heat treatment on the steel material for a welded steel pipe of claim 1, the steel material comprising:

as a microstructure, bainite in 30% or lower excluding 0% by area fraction and a balance of ferrite.

6. The steel material of claim 5, wherein an average grain size of bainite at a central part of a thickness of the steel material is 30 μm or less.

7. The steel material of claim 5, wherein an average grain size of ferrite at a central part of a thickness of the steel material is less than 20 μm.

8. The steel material of claim 5, wherein the steel material has a drop weight tear test (DWTT) ductility-brittleness transition temperature of −10° C. or lower.

* * * * *